(No Model.)
J. JOHNSTON.
VEHICLE.
No. 520,961. Patented June 5, 1894.
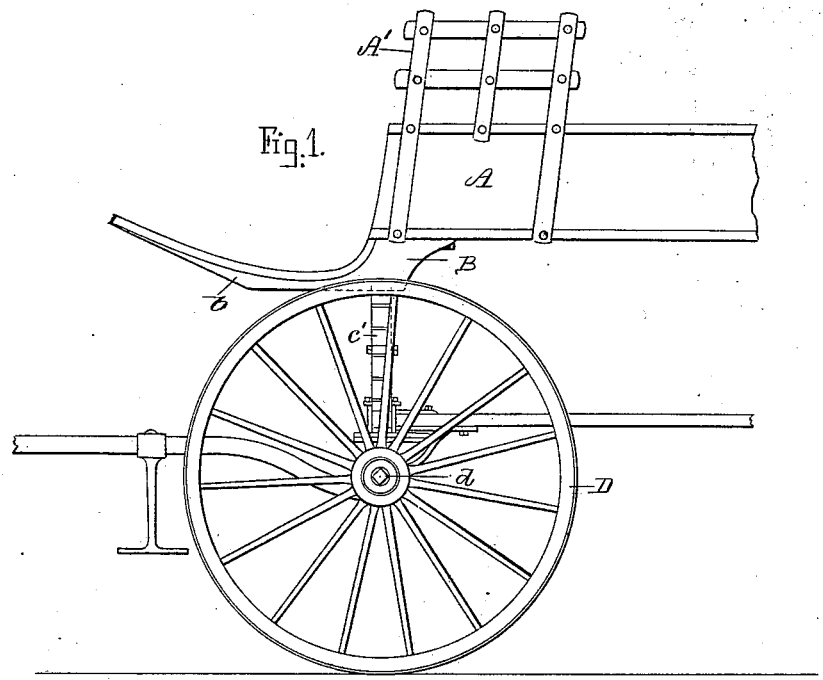
Fig. 1.
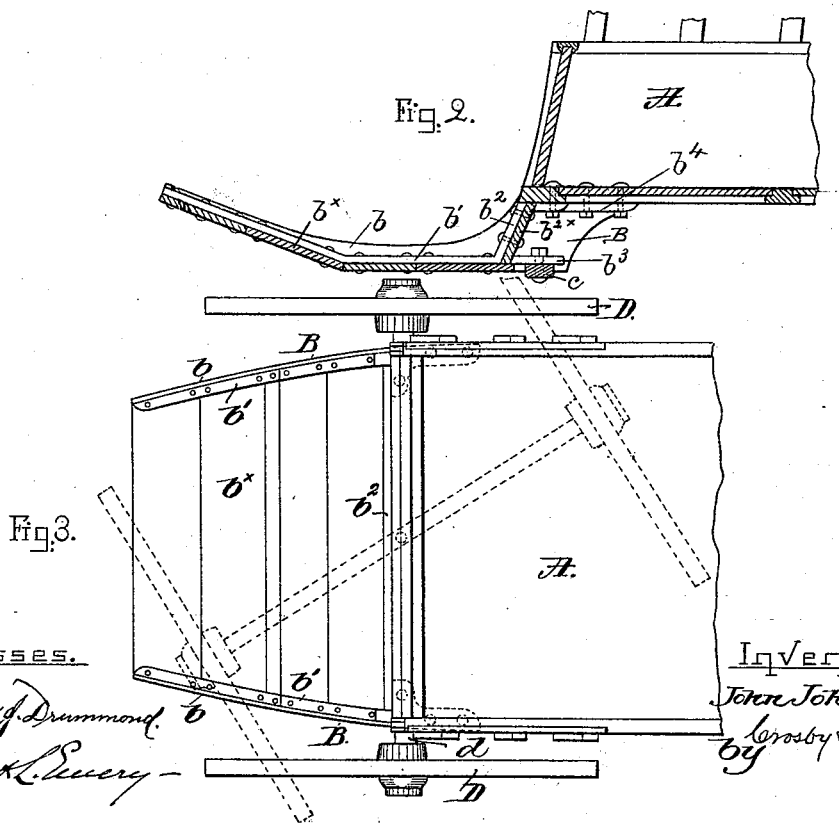
Fig. 2.
Fig. 3.
Witnesses.
Thomas J. Drummond.
Frederick L. Emery.
Inventor.
John Johnston.
Crosby & Gregory
by
Attys.

UNITED STATES PATENT OFFICE.

JOHN JOHNSTON, OF HYDE PARK, MASSACHUSETTS.

VEHICLE.

SPECIFICATION forming part of Letters Patent No. 520,961, dated June 5, 1894.

Application filed August 30, 1893. Serial No. 484,382. (No model.)

*To all whom it may concern:*

Be it known that I, JOHN JOHNSTON, of Hyde Park, county of Norfolk, State of Massachusetts, have invented an Improvement in Vehicles, of which the following description, in connection with the accompanying drawings, is a specification, like letters on the drawings representing like parts.

This invention in vehicles has particular reference to what are known as drop front wagons or carriages in which the foot board is dropped below the portion of the vehicle body immediately in the rear of the foot board.

Prior to this invention, in vehicles of the class above referred to, the foot board has been carried by drop brackets of wood stiffened by metallic plates bolted or otherwise secured to its sides, but such brackets have, so far as I am aware, always been straight brackets projecting directly outward from the front of the body. The use of brackets made and arranged in this manner has made it necessary to place the forward spring bar and the wheels upon which the same is carried in an extreme forward position in order that the wheels in turning should not contact with the forward end of the foot board, but should swing clear and in front of said foot board. When, however, the spring bar and wheels are thus placed in this extreme forward position, the driver can reach the foot board and seat from the ground only over the wheel, or from the rear thereof, the wheels being so far forward as to make it impossible for him to mount from in front of the wheels, which is by far the most convenient.

In accordance with this my present invention I construct the drop foot board brackets of metal, suitably formed at their rear ends to be secured to the vehicle body, and at their front ends bent or inclined inwardly and upwardly in order that the spring bar and wheels may be placed farther back toward the body, yet permit the wheels to be fully turned beneath the foot board and without contacting with said brackets. By such a construction the wheels may be placed so far back that the driver may mount to his seat from in front of the wheels as in the ordinary wagon as usually constructed.

One part of this invention, therefore, consists in the combination with a body, of foot board supporting drop-brackets secured at their rear ends thereto and consisting each of a metal side inclined inwardly and upwardly at its forward end and provided along its inner face with a foot-board support, and at its rear end with a spring bar support, substantially as will be described.

Other features of this invention will be hereinafter described and pointed out in the claims.

Figure 1 of the drawings represents in side elevation a sufficient portion of a wagon to enable this invention to be understood; Fig. 2, a vertical longitudinal section of the same taken on the dotted line $x$—$x$, Fig. 3; and Fig. 3, a top or plan view of Fig. 1.

Referring to the drawings A represents a portion of the body of a vehicle, shown as a wagon, the same being provided with a usual seat A'.

In accordance with this invention I provide drop foot-board supporting brackets B, shown as two in number, and formed preferably of cast iron or steel.

Referring particularly to Figs. 2 and 3, each bracket B consists of a side plate $b$ of suitable shape, preferably curved upwardly, as shown, said plate having formed upon its inner face a suitable inwardly projecting support shown as a longitudinal rib $b'$ to which may be bolted or otherwise secured the foot boards $b^x$. At the rear end of each bracket the side plate $b$ thereof is preferably provided with a vertical or inwardly inclined projecting support or rib $b^2$, to which is secured the panel board or boards extending from the bottom of the body to the foot boards. The longitudinal rib $b'$ is shown as extended rearwardly beyond the inclined rib $b^2$, said extended portion adjacent or beneath the front end of the body A constituting a preferred form of spring bar seat or support $b^6$ to which is bolted or otherwise secured the spring bar $c$ resting upon the spring $c'$, the latter supported in usual manner upon the axle $d$ carrying the wheels D.

By reference to Fig. 3 it will be seen that the drop brackets B, B, are each bent or curved inwardly to thereby very much narrow the front raised end of the foot board in order that in turning, by the time the front wheels have been turned sufficiently to reach the front board, the latter will, owing to its upward and inward inclination, have reached such a level as will permit the wheels to cut under.

If the drop brackets were carried out perfectly straight instead of inclined inwardly as shown, the wheels would reach the vertical plane of the brackets at a much lower level than in the construction shown.

After the above explanation it will be evident why it has always heretofore been necessary to place the spring bar and wheels so much farther forward, for referring to Fig. 2, if the brackets were carried out perfectly straight and it was desired to use wheels of a diameter such as would extend above the level of the foot board, as shown, it would be necessary to place said wheels so far forward that in turning they would swing in front of or behind the drop foot board.

When the wheels are placed farther forward than as shown in the drawings, it is necessary for the driver in getting in and out to do so either directly over or from behind the wheels. Both of these, are, however, open to serious inconvenience, sufficient it may be stated, to practically exclude the drop front wagon from the market up to the present time.

By constructing the brackets as herein shown and described, i. e., of metal having the spring bar seats at or near their rear ends, and with their forward ends inclined inwardly and upwardly, it is possible to place the wheels far enough back to permit the driver to mount from the front of the wheels, yet at the same time permit the wheels to cut under at all times.

As shown in the drawings, the brackets at their rear ends immediately back of their inclined ribs $b^2$ are provided with inwardly projecting flanges $b^4$, by means of which said brackets are bolted or otherwise secured to the body.

Having described one embodiment of my invention, and without restricting the same to the particular details of construction, what I claim, and desire to secure by Letters Patent, is—

1. The herein described metallic drop foot-board supporting bracket, consisting of a side portion, as $b$, having formed upon its inner face a foot-board support, and an upright panel support, and a spring bar seat at or near the rear end of said support, substantially as described.

2. The combination with a body, of foot board supporting drop-brackets secured at their rear ends thereto and consisting each of a metal side inclined inwardly and upwardly at its forward end and provided along its inner face with a foot-board support and at its rear end with a spring bar support, substantially as described.

3. The herein described drop foot board supporting bracket, consisting of a casting presenting a side portion $b$ shaped substantially as described, having formed upon its inner face a foot board support, and a spring bar seat at or near the rear end of said bracket, substantially as described.

In testimony whereof I have signed my name to this specification in the presence of two subscribing witnesses.

JOHN JOHNSTON.

Witnesses:
FREDERICK L. EMERY,
M. J. SHERIDAN.